United States Patent Office 3,437,565
Patented Apr. 8, 1969

---

3,437,565
ELIMINATION OF CARBON TRACES CONTAINED IN TITANIUM BY THE ADDITION OF ALUMINUM CHLORIDE
Pierre J. H. L. Portes, Jacques Richerd, and Robert Mas, Thann, France, assignors to Fabriques de Produits Chimiques de Thann et de Mulhouse, Thann, Haut-Rhin, France
No Drawing. Filed Sept. 6, 1966, Ser. No. 577,146
Claims priority, application France, Sept. 7, 1965, 30,648
Int. Cl. B01d 3/34
U.S. Cl. 203—29                        6 Claims

ABSTRACT OF THE DISCLOSURE

Process of purifying titanium tetrachloride contaminated by carbonaceous impurities. The contaminated titanium tetrachloride is distilled in the presence of anhydrous aluminum chloride. Pereferably, 0.05 to 3% by weight of the aluminum chloride are added to the contaminated titanium tetrachloride.

---

As is generally known, the purification of titanium tetrachloride which entails the removal of different impurities contained in particular in the ore itself is a process which is carried out in steps. One of these steps consists in removing the vanadium which is present. It is also known that the treatment of titanium tetrachloride with different organic compounds and more specifically with mineral or vegetable oils makes it possible to extract the vanadium by means of a process of cracking the organic substance and reducing the vanadium to the state of nonvolatile compounds. The distillation of the titanium tetrachloride which has been treated in this manner results in a product which is free of vanadium.

However, the process referred to has a disadvantage in that a small quantity of organic substances is permitted to remain in the titanium tetrachloride and must consequently be removed. In point of fact, these impurities make the tetrachloride unfit for the fabrication of titanium metal and also interfere with the proper course of operations when the tetrachloride is oxidized with a view to obtaining titanium oxide pigment.

It has been discovered in accordance with the present invention that these carbonaceous substances could be removed almost entirely by addition of a purification agent constituted by anhydrous aluminum chloride and distillation of titanium tetrachloride.

Accordingly, it is an object of the present invention to provide a process for removing carbon compounds contained in titanium tetrachloride, said process consisting in introducing anhydrous aluminum chloride in boiling titanium tetrachloride and in distilling the tetrachloride.

The proportions of aluminum chloride vary between the limits of 0.05 and 3% and preferably between 0.1 and 1% by weight with respect to the weight of titanium tetrachloride. The aluminum chloride is added to the boiling titanium tetrachloride and the mixture is refluxed for a certain period of time.

Although the nature of the process which takes place during this operation is not known with any degree of certainty, there is every reason to believe that the organic substances present in the titanium tetrachloride undergo a cracking process in which the aluminum chloride performs the function of catalyst.

The process in accordance with the invention can be carried out either in continuous or discontinuous operation. The example of application which is described hereinafter will serve as an explanatory illustration of the process without thereby implying any limitation of its scope.

A constant-level titanium tetrachloride distillation column having a capacity of 3 tons is supplied at a rate of 750 kgs. per hour with vanadium-free titanium tetrachloride containing 80 p.p.m. of carbon in the form of soluble organic compounds (with the exception of carbonyl chloride). The distillation column receives simultaneously 0.1%, namely 750 grams of anhydrous aluminum chloride which is introduced at a rate of 375 grams at half-hourly intervals. It is apparent that, on completion of the initial filling operation, a proportion of 0.1% of anhydrous aluminum chloride corresponding to a quantity of 3000 grams will have been fed into the distillation column. Subsequent analysis of the distilled and condensed titanium tetrachloride shows that this latter contains a quantity of carbon which is less than 10 p.p.m. In order to prevent the contents of the column from being enriched with carbonaceous substances liberated by the presence of aluminum chloride, a small proportion of titanium tetrachloride must be withdrawn at regular intervals.

What we claim is:

1. A process of purifying titanium tetracholride contaminated by carbonaceous impurities but substantially free of vanadium, which comprises distilling the contaminated titanium tetrachloride in the presence of about between 0.05 to 3% by weight with respect to the weight of titanium tetrachloride, an additive consisting essentially of anhydrous aluminum chloride.

2. A process in accordance with claim 1, characterized in that the quantity of aluminum chloride is within the range of 0.1 to 1% by weight with respect to the weight of titanium tetrachloride.

3. A process in accordance with claim 1, characterized in that said process is carried out in continuous or discontinuous operation.

4. A process as claimed in claim 1, wherein the distillation is carried out under reflux conditions.

5. A process of purifying titanium tetrachloride contaminated by carbonaceous impurities but substantially free of vanadium, which comprises adding to boiling contaminated titanium tetrachloride about 0.05 to 3% by weight with respect to the weight of titanium tetrachloride, and additive consisting essentially of anhydrous aluminum chloride, and removing titanium tetrachloride from the mixture thus obtained by distillation.

6. A process as claimed in claim 5, wherein the distillation is carried out under reflux.

References Cited

UNITED STATES PATENTS

| 2,836,547 | 5/1958 | Stoddard et al. | |
| 2,915,364 | 12/1959 | Clabaugh | 203—29 |
| 3,156,630 | 11/1964 | Fahnoe et al. | 203—50 |

FOREIGN PATENTS

| 523,411 | 4/1956 | Canada. |

WILBUR L. BASCOMB, JR., Primary Examiner.

U.S. Cl. X.R.

23—87; 203—50, 98.